Figure 1:
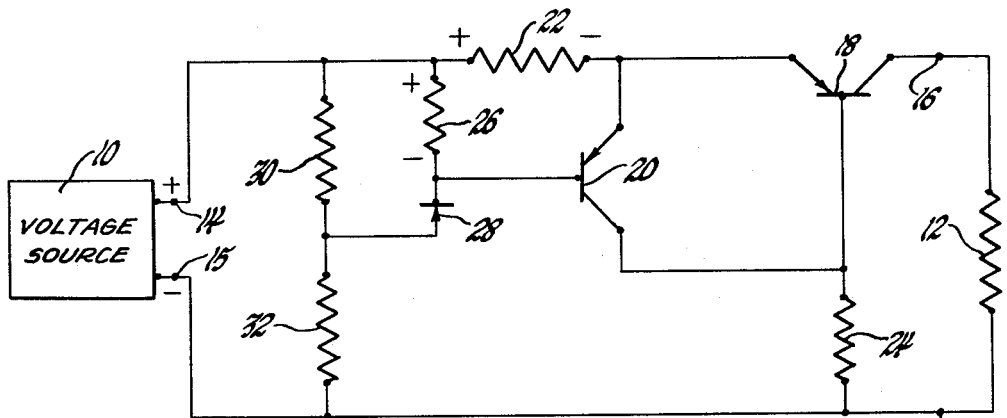

Aug. 7, 1962

F. J. STARZEC ET AL 3,048,718

TRANSIENT RESPONSIVE PROTECTION CIRCUIT

Filed Jan. 13, 1959

Inventors
Francis J. Starzec
Joseph E. Murphy

By Paul J. Ethington
Attorney

United States Patent Office

3,048,718
Patented Aug. 7, 1962

3,048,718
TRANSIENT RESPONSIVE PROTECTION CIRCUIT
Francis J. Starzec, Fullerton, Calif., and Joseph E. Murphy, Cudahy, Wis., assignors to General Motors Corporation, Detroit, Mich., a corporation of Delaware
Filed Jan. 13, 1959, Ser. No. 786,625
6 Claims. (Cl. 307—93)

This invention relates to overvoltage protection systems and more particularly to a circuit for the protection of transistors and the like from transient voltages.

Despite the many advantages of transistors, they are susceptible to damage or destruction by transient voltages of excessive amplitude even though the transient is of very short duration. This characteristic has restricted the use of transistors in communications and control circuits especially in aircraft where the advantages of ruggedness, small size, and weight are most desired but where reliability is of paramount importance. This restriction arises because aircraft direct current power supplies for such circuits develop transient voltages, which exceed the permissible rating for transistors, from switching and other disturbances in the power supply system.

Voltage regulators have been proposed to protect transistors from overvoltage, but the regulator itself lacks reliability since the regulating transistor, during a slow transient, operates in a non-saturated region which results in high dissipation and transistor failure. Such disadvantages of the prior art systems are completely obviated by this invention.

In accordance with this invention, the protection circuit completely isolates the load from the power supply by opening the circuit therebetween for the duration of excessive transient voltage. This is accomplished by a controlled transistor in series between the voltage source and the load and forwardly biased to a condition of current saturation or full conduction. A control transistor has its input circuit connected across the voltage source through a bias resistor and a voltage reference device, such as a Zener diode, biased to provide a conduction threshold or firing point at a predetermined voltage of the source. The control transistor is reversely biased to a condition of current cut-off or non-conduction by load current through a resistance in its input circuit and its output circuit is connected to the input circuit of the controlled transistor. In response to an excessive transient voltage, the Zener diode conducts through the bias resistor causing the control transistor to become fully conductive and the controlled transistor to be cut-off to disconnect the load from the source. Accordingly, the transistor power dissipation in either switching state is minimized and high efficiency operation with enhanced reliability is achieved. Additionally, the circuit gain is stabilized to maintain the switching point constant regardless of temperature and load current variation.

Figure 2:
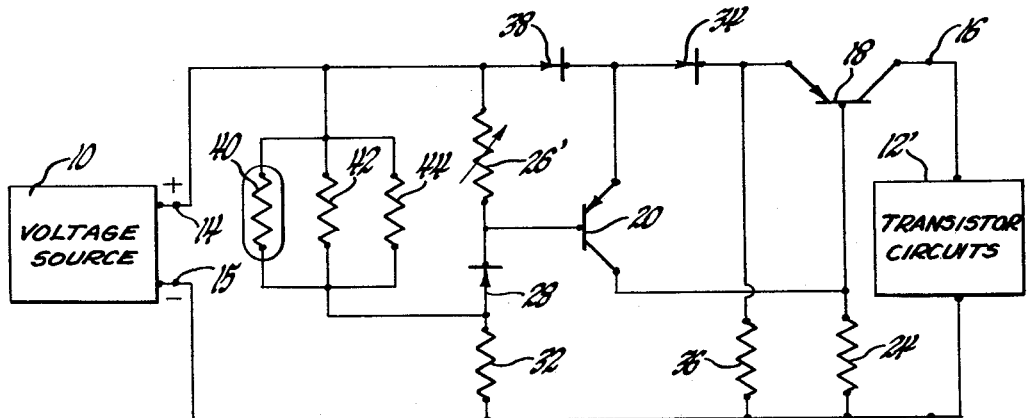

A more complete understanding of this invention may be had from the detailed description which follows taken with the accompanying drawings in which:

FIGURE 1 is a schematic diagram of the basic transient responsive protection circuit; and FIGURE 2 is a schematic diagram of a preferred embodiment of the transient responsive protection circuit.

Referring now to the drawings, there is shown an illustrative embodiment of the invention in a transient responsive protection circuit interposed between a voltage source 10 and a load device or resistor 12. The voltage source 10, for example, may be an aircraft direct current power supply which conventionally has a nominal voltage of 28 volts and a permissible voltage variation of plus 10 percent and minus 20 percent. Current specifications on such power supplies require that voltage transients continuing for more than 0.02 second be limited to 80 volts maximum with the time constant of the envelope of the maximum amplitude of a series of transients being less than 0.44 second. Single voltage transients or a series thereof less than 0.02 second duration may exceed 80 volts and are suitably limited by a filter circuit (not shown) ahead of the transient responsive protection circuit. The load device, represented for convenience by the resistor 12 in FIGURE 1, may be a radio transmitter or receiver including transistors. Consequently, such a load device because of the inherent characteristics of the transistors must not be subjected to voltages exceeding a predetermined value, for example, 36 volts.

The transient responsive circuit, having input terminals 14 and 15 and output terminals 16 and 17, comprises a controlled transistor 18 and a control transistor 20 connected in a common or oscillatory loop between the input and output terminals to function as a switch. In this illustrative embodiment, the transistors 18 and 20 are PNP junction type power transistors but it will be apparent that the NPN type transistor may be used with suitable reversal of polarities.

The controlled transistor 18 has an output circuit extending between the emitter and collector electrodes and connected across the terminals of the voltage source and including the load resistor 12 in the collector circuit and a series resistor 22 in the emitter circuit. The input circuit of the controlled transistor 18 extends between the emitter and base electrodes and includes a current limiting resistor 24 in the base circuit. In a normal condition, i.e., in the absence of a voltage transient across the input terminals, the controlled transistor is forwardly biased by the emitter to base current to hold the emitter to collector circuit, which carries the entire load current, in the region of current saturation.

The control transistor 20 has an input circuit extending between emitter and base electrodes including the series resistor 22 and a resistor 26. The resistor 26 is connected in series with a voltage reference device or Zener diode 28 which is reversely biased by connection with the junction of voltage divider resistors 30 and 32 connected across the input terminals. The Zener diode, as is well known, exhibits the property of current conduction in the reverse direction at substantially constant voltage when a predetermined conduction threshold voltage is exceeded and is substantially non-conductive at lower voltages. The output circuit of the control transistor 20 extends between the emitter and collector electrodes and includes the resistor 24 in the collector circuit. In the normal condition, the control transistor 20 is reversely biased to current cut-off by the voltage drop developed by the load current flowing through the series resistor 22.

In operation of the circuit shown in FIGURE 1, assuming the voltage across the input terminals does not exceed the predetermined value, the control transistor 20 is nonconductive and the controlled transistor is conductive and carries the load current. Upon the occurrence of an input voltage transient exceeding the predetermined value, the Zener diode 28 breaks down permitting current flow through the resistor 26. When the voltage drop across the resistor 26 is equal to the voltage across series resistor 22, the control transistor becomes forwardly biased and its output circuit becomes conductive through the resistor 24. The voltage drop developed across resistor 24 reduces the forward bias on the controlled transistor 18 and reduces its output circuit conduction. Accordingly, the voltage drop across the series resistor 22 is reduced and the forward bias on the control transistor 20 is further increased which increases the current flow through the resistor 24 and the controlled transistor 18 is further biased toward its non-conductive condition. Because of the oscillatory or regenerative relation of the transistors, this switching action occurs instantaneously and the voltage source is disconnected from the load circuit. When the transient voltage has diminished below the predetermined value, the Zener diode 28 returns rapidly toward the non-conductive state and the voltage drop across shunt resistor 26 approaches zero and the voltage drop across the series resistor 22 again predominates to bias the control transistor 20 to the non-conductive condition. Accordingly, the decreasing current through transistor 20 causes the voltage drop across the resistor 24 to decrease which results in forward bias on the controlled transistor 18. This increases the current through the resistor 22 which causes the transistor 20 to approach the non-conductive state even more rapidly, and an oscillatory or regenerative action occurs between the control and controlled transistors. The result is instantaneous switching of both transistors.

The basic transient responsive circuit of FIGURE 1 provides an advantageous type of switching action but is subject to an undesirable amount of power dissipation in the controlled transistor and to lack of stability due to the inherent characteristics of the transistors and their behavior with temperature variations. Accordingly, this basic circuit is modified as shown in FIGURE 2 wherein the same components are identified by the same reference characters and additional components are employed. In the circuit of FIGURE 1, the occurrence of a transient greater than a predetermined value causes control transistor 20 to be switched fully on and the control transistor 18 to be switched off. With the transistor 20 fully on, its emitter to collector circuit does present a finite resistance and hence a voltage drop which develops a slight forward bias on the emitter to base of the controlled transistor 18. In this condition, therefore, transistor 18 is not completely cut-off but instead is somewhat conductive and is operating in the region of high power dissipation which will lead to destruction of the transistor. In the embodiment of FIGURE 2, this condition is eliminated by provision of a substantially constant voltage drop in the input circuit of transistor 18. More specifically, a diode 34, suitably of the semiconductor type, is connected between the emitter of transistor 18 and the emitter of transistor 20 in series with a resistor 36 of high value which is connected to the input terminal 15 to form a voltage divider. Thus, the diode 34 carries the varying load current and develops a substantially constant polarized voltage drop which exceeds the voltage drop across the emitter to collector of the transistor 20 to bias the transistor 18 in the reverse direction when transistor 20 is conductive. Accordingly, transistor 18 is fully cut-off and its power dissipation is reduced to a minimum.

In order to stabilize the operation of the transient responsive circuit against variations in load current, a diode 38, suitably of the semiconductor type, is connected in the load current path between the emitter and base of transistor 20. The diode 38 provides stabilization of the switching point with variations in load current since it provides substantially constant voltage drop. Accordingly, the bias on transistor 20, and hence its gain, remain constant over a wide range of load current variation.

The temperature characteristic of transistors is such that an increasing temperature increases the emitter to collector current for a given emitter to base bias current with the result that increased reverse bias is required to maintain the transistor at current cut-off. Without provision for temperature compensation, the switching point of the transient responsive circuit tends to occur at a decreased voltage as the temperature increases. In certain applications, especially where the load resistance is of the same order of magnitude as the emitter to collector resistance of the controlled transistor 18, the diode 38 also affords temperature stabilization of the switching point. The diode 38 has a negative temperature coefficient so that increasing current through transistor 18, resulting from increased temperature, produces a voltage drop across diode 38 which remains substantially constant. Consequently, the diode 38 has the effect of maintaining a constant bias on transistor 20 over a wide range of temperature variations.

However, to maintain the switching point constant despite temperature variation for any value of load resistance, and especially for high resistance loads, it is convenient to employ a Zener diode 28 with a temperature coefficient of a resistance of approximately zero and provide temperature compensation for the transistor circuits. This is accomplished by a thermistor 40 having a negative temperature coefficient and connected in series with the voltage divider resistor 32. A pair of resistors 42 and 44 are connected in parallel with the thermistor 40 so that the negative temperature characteristic of the voltage divider is the inverse characteristic of the transistor circuits. Alternatively, temperature stabilization is achieved by employing a Zener diode having a positive temperature characteristic which is the same as the negative temperature characteristic of the transistor circuits and the thermistor 40 and resistors 42 and 44 may be omitted. Adjustment of the switching point is provided by using a variable resistor 26' in series with the Zener diode 28.

In operation of the embodiment of FIGURE 2, wherein the voltage source 10 is connected with the load device 12' through the transient responsive circuit, the transistor 20 is maintained at cut-off by the voltage drop across the diode 38, in the absence of transient voltage in excess of the predetermined value established by the Zener diode 28 and the adjustment of variable resistor 26'. In this condition, transistor 18 is fully conductive. The gain of the transistors 18 and 20, and hence the switching point of the circuit, remain constant despite temperature and load current variations due to the temperature compensation afforded by the thermistor 40 and associated network and the constant voltage drop provided by the diode 38. Furthermore, the transistor 18 is maintained in the region of current saturation so that it is operated at low power dissipation. When a voltage transient greater than the predetermined value occurs, the Zener diode 28 conducts and transistor 20 is biased in the forward direction when the voltage drop across resistor 26' exceeds that across diode 38. Accordingly, the emitter to collector current of transistor 20 develops a voltage drop across the resistor 24 which biases the transistor 18 to current cut-off. Of course, the switching action is instantaneous and the supply voltage is excluded from the load circuit until the transient diminishes to the predetermined value. At this point, instantaneously the transistor 20 becomes non-conductive and the transistor 18 becomes fully conductive to deliver the load current to the load device.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. A transient responsive circuit having a pair of input terminals for connection with a voltage source and a pair of output terminals for connection with a load, a controlled transistor having its output circuit connected between one input terminal and one output terminal and its input circuit connected across the input terminals so that the controlled transistor is normally forwardly biased when a voltage is applied across the input terminals, a semiconductor diode connected in said output circuit between said one input terminal and the controlled transistor, a voltage dividing resistor connected in series with said diode across the source a voltage reference device and a resistor connected in series therewith across the input terminals, a control transistor having an output circuit connected across the input circuit of the controlled transistor and an input circuit connected across said resistor and said diode to normally reversely bias the control transistor, said voltage reference device being adapted to become conductive at a predetermined voltage whereby the control transistor is forwardly biased and the controlled transistor is reversely biased to disconnect the voltage source from the load.

2. A transient responsive circuit having a pair of input terminals for connection with a voltage source and a pair of output terminals for connection with a load, a controlled transistor having its output circuit connected between one input terminal and one output terminal and its input circuit connected across the input terminals so that the controlled transistor is normally forwardly biased when voltage is applied across the input terminals, first and second diodes connected in said output circuit between said one input terminal and the controlled transistor, a limiting resistor connected in said input circuit between the other input terminal and the controlled transistor, a Zener diode and a bias resistor connected in series across the input terminals, a control transistor having an output circuit connected across the input circuit of the controlled transistor and an input circuit connected across said bias resistor and the first diode to normally reversely bias the control transistor, and a voltage dividing resistor connected across the input terminals through the second diode, said Zener diode being adapted to become conductive at a predetermined voltage across the input terminals whereby the control transistor becomes conductive and the controlled transistor becomes reversely biased to current cut-off by the voltage drop across the second diode.

3. A transient responsive circuit having a pair of input terminals for connection with a voltage source and a pair of output terminals for connection with a load, a controlled transistor having its output circuit connected between one input terminal and one output terminal and its input circuit connected across the input terminals so that the controlled transistor is normally forwardly biased when voltage is applied across the input terminals, a diode connected in said output circuit between said one input terminal and the controlled transistor, a limiting resistor connected in said input circuit between the other input terminal and the controlled transistor, a Zener diode and a bias resistor connected in series across the input terminals, a control transistor having an output circuit connected across the input circuit of the controlled transistor and an input circuit connected across said resistor and the first mentioned diode to normally reversely bias the control transistor to an extent independent of load current, said Zener diode being adapted to become conductive at a predetermined voltage across the input terminals whereby the control transistor becomes forwardly biased by the voltage drop across the bias resistor and the controlled transistor becomes reversely biased by the voltage drop across the limiting resistor, the Zener diode having a substantially zero temperature coefficient of resistance, a voltage dividing resistor connected between the Zener diode and the said other input terminal, and a temperature responsive resistive network connected between the input terminals through the voltage dividing resistor and having a temperature characteristic which is inversely related to that of the transistors whereby the bias voltage on the Zener diode varies with temperature to maintain the switching point of the transistors independent of temperature.

4. A transient responsive circuit having a pair of input terminals for connection with a voltage source and a pair of output terminals for connection with a load, a controlled transistor having its output circuit connected between one input terminal and one output terminal and its input circuit connected across the input terminals so that the controlled transistor is normally forwardly biased when voltage is applied across the input terminals, a diode connected in said output circuit between said one input terminal and the controlled transistor, a limiting resistor connected in said input circuit between the other input terminal and the controlled transistor, a Zener diode and a bias resistor connected in series across the input terminals, and a control transistor having an output circuit connected across the input circuit of the controlled transistor and an input circuit connected across said bias resistor and the first mentioned diode to normally reversely bias the control transistor, said Zener diode being adapted to become conductive at a predetermined voltage across the input terminals whereby the control transistor becomes forwardly biased by the voltage drop across the bias resistor and the controlled transistor becomes reversely biased by the voltage drop across the limiting resistor, the Zener diode having a resistance-temperature characteristic the same as that of the transistors whereby the switching point of the transistors is independent of temperature.

5. A transient responsive circuit having a pair of input terminals for connection with a voltage source and a pair of output terminals for connection with a load, at least one controlled transistor having first, second, and third electrodes, and unbypassed output circuit extending through the first and second electrodes and between one input terminal and one output terminal, the transistor having an input circuit extending through the first and third electrodes and between the input terminals, a limiting resistor connected between the third electrode and one input terminal, first and second diodes connected between the first electrode and the other input terminal, a bias resistor and a Zener diode connected in series across said input terminals with the Zener diode poled for reverse conduction relative to the source, a control transistor having an input circuit connected across the bias resistor and the first diode and an output circuit connected across the series connection of the second diode and the input circuit electrodes of the controlled transistor whereby the controlled transistor is normally forwardly biased into the region of current saturation by voltage across the input terminals and the control transistor is normally reversely biased to current cut-off by the voltage drop developed by load current through the first diode, said Zener diode becoming conductive at a predetermined value of voltage across the input terminals whereby the voltage drop across the bias resistor exceeds that across the first diode and the control transistor becomes conductive through the limiting resistor to reversely bias the controlled transistor, and a voltage dividing resistor connected in series with the second diode across the input terminals whereby the second diode develops a voltage drop to compensate for the voltage drop across the output circuit electrodes of the control transistor to reversely bias the controlled transistor to complete current cut-off.

6. In combination, a load device, a voltage source, and a transient responsive circuit connected between the source and the load device including at least one controlled transistor having first, second, and third electrodes, an output circuit extending between the first and second electrodes and connected in series between the source and the load device, the transistor having an input circuit extending between the first and third electrodes and being normally forwardly biased by the voltage source and including a resistor in the circuit of the third electrode, said input circuit also including a semiconductor diode in circuit with the first electrode and adapted to conduct the load current, said semiconductor diode being poled for forward conduction in the same direction as the first and third electrodes of the controlled transistor whereby the voltage drop is substantially independent of load current variations, a voltage dividing resistor connected in series with said diode across the source, a voltage amplitude responsive circuit connected across the source, a control transistor having an input circuit connected with the voltage amplitude responsive circuit and having an output circuit connected across the third electrode of the controlled transistor and said diode, whereby a transient voltage in excess of said predetermined amplitude renders the control transistor conductive and the voltage drop across said diode predominates over the internal voltage drop in the control transistor to reversely bias the input circuit of the controlled transistor to render the controlled transistor output circuit completely non-conductive.

References Cited in the file of this patent

UNITED STATES PATENTS

| | | |
|---|---|---|
| 2,776,382 | Jensen | Jan. 1, 1957 |
| 2,832,900 | Ford | Apr. 29, 1958 |
| 2,888,633 | Carter | May 26, 1959 |
| 2,903,640 | Bixby | Sept. 8, 1959 |